(12) United States Patent
Fernandes Oliveira et al.

(10) Patent No.: US 11,697,387 B2
(45) Date of Patent: Jul. 11, 2023

(54) AIRBAG MODULE FOR AUTOMOTIVE VEHICLE

(71) Applicants: DALPHI METAL ESPANA S.A., Vigo (ES); SAFELIFE INDUSTRIA DE COMPONENTES DE SEGURANCA AUTOMOVEL S.A., Gemieira (PT)

(72) Inventors: José Miguel Fernandes Oliveira, Braga (PT); Pedro Jose Santín Navarro, Vigo (ES)

(73) Assignees: Dalphi Metal Espana, S.A., Vigo (ES); Safelife Industria de Componentes de Seguiranca Automovel S.A., Gemieira (PT)

( * ) Notice: Subject to any disclaimer, the term of this patent is extended or adjusted under 35 U.S.C. 154(b) by 0 days.

(21) Appl. No.: 17/289,401

(22) PCT Filed: Nov. 19, 2019

(86) PCT No.: PCT/EP2019/081823
§ 371 (c)(1),
(2) Date: Apr. 28, 2021

(87) PCT Pub. No.: WO2020/104470
PCT Pub. Date: May 28, 2020

(65) Prior Publication Data
US 2021/0387590 A1 Dec. 16, 2021

(30) Foreign Application Priority Data
Nov. 19, 2018 (DE) .......................... 202018106544.0

(51) Int. Cl.
*B60R 21/213* (2011.01)
*B60R 21/201* (2011.01)
(Continued)

(52) U.S. Cl.
CPC .......... *B60R 21/213* (2013.01); *B60R 21/201* (2013.01); *B60R 21/232* (2013.01); *B60R 21/2338* (2013.01); *B60R 2021/23386* (2013.01)

(58) Field of Classification Search
CPC ... B60R 21/201; B60R 21/213; B60R 21/232; B60R 21/2338; B60R 21/2342; B60R 2021/23386
See application file for complete search history.

(56) References Cited

U.S. PATENT DOCUMENTS 6,095,551 A * 8/2000 O'Docherty ............ B60R 21/08
280/730.2
6,176,515 B1 * 1/2001 Wallner .............. B60R 21/2338
280/730.2

(Continued)

FOREIGN PATENT DOCUMENTS

DE 102008051594 A1 9/2009
DE 102011076056 A1 12/2011
(Continued)

OTHER PUBLICATIONS

International Search Report and Written Opinion for PCT/EP2019/081823 dated Jan. 14, 2020 (10 pages; with English translation).

*Primary Examiner* — Laura Freedman
(74) *Attorney, Agent, or Firm* — Kristin L. Murphy

(57) ABSTRACT

An airbag module for an automotive vehicle is disclosed. The airbag module comprises a folded inflatable airbag, a fastening element for mounting the airbag on the vehicle, a mounting jacket in which the folded airbag is received and fixed, as well as an elongate flexible holding strap for positioning the airbag in its deployed inflated state. The holding strap extends from a first strap end fastened on the airbag to an opposite second strap end to which the fastening element is attached. In the folded state of the airbag, the (Continued)

holding strap is connected to the mounting jacket or is received in the mounting jacket.

16 Claims, 2 Drawing Sheets

(51) Int. Cl.
    *B60R 21/2338*    (2011.01)
    *B60R 21/232*     (2011.01)

(56) References Cited

U.S. PATENT DOCUMENTS

| | | | | |
|---|---|---|---|---|
| 6,234,517 B1* | 5/2001 | Miyahara | | B60R 21/04 |
| | | | | 280/751 |
| 6,237,939 B1* | 5/2001 | Resh | | B60R 21/232 |
| | | | | 280/730.2 |
| 6,382,663 B1* | 5/2002 | Tietze | | B60R 21/213 |
| | | | | 280/730.2 |
| 6,412,810 B1* | 7/2002 | Wipasuramonton | | |
| | | | | B60R 21/232 |
| | | | | 280/730.2 |
| 6,464,250 B1* | 10/2002 | Faigle | | B60R 21/232 |
| | | | | 280/730.2 |
| 6,626,456 B2* | 9/2003 | Terbu | | B60R 21/20 |
| | | | | 280/730.2 |
| 6,709,008 B2* | 3/2004 | McGee | | B60R 21/232 |
| | | | | 280/730.2 |
| 6,758,490 B2* | 7/2004 | Hoeft | | B60R 21/2338 |
| | | | | 280/730.2 |
| 6,851,710 B2* | 2/2005 | Wong | | B60R 21/213 |
| | | | | 280/743.2 |
| 7,845,674 B2* | 12/2010 | Berntsson | | B60R 21/232 |
| | | | | 280/730.2 |
| 8,006,998 B2* | 8/2011 | Hatfield | | B60R 21/232 |
| | | | | 280/730.2 |
| 8,562,018 B1* | 10/2013 | Wantin | | B60R 21/232 |
| | | | | 280/730.2 |
| 8,864,167 B2* | 10/2014 | Kraft | | B60R 21/2338 |
| | | | | 280/730.2 |
| 8,960,716 B2* | 2/2015 | Takeuchi | | B60R 21/2338 |
| | | | | 280/730.2 |
| 9,539,974 B2* | 1/2017 | Fukuda | | B60R 21/232 |
| 10,814,825 B2* | 10/2020 | Maximino | | B60R 21/235 |
| 11,465,580 B2* | 10/2022 | Silverwood | | B60R 21/017 |
| 2004/0026901 A1* | 2/2004 | Yann | | B60R 21/213 |
| | | | | 280/727 |
| 2005/0011057 A1* | 1/2005 | Dominssini | | B60R 21/2338 |
| | | | | 24/570 |
| 2007/0126214 A1 | 6/2007 | Quach et al. | | |

FOREIGN PATENT DOCUMENTS

| | | |
|---|---|---|
| EP | 1286867 B1 | 12/2004 |
| EP | 2995513 A1 | 3/2016 |
| GB | 2394921 A | 5/2004 |
| JP | 2017105391 A * | 6/2017 |

\* cited by examiner

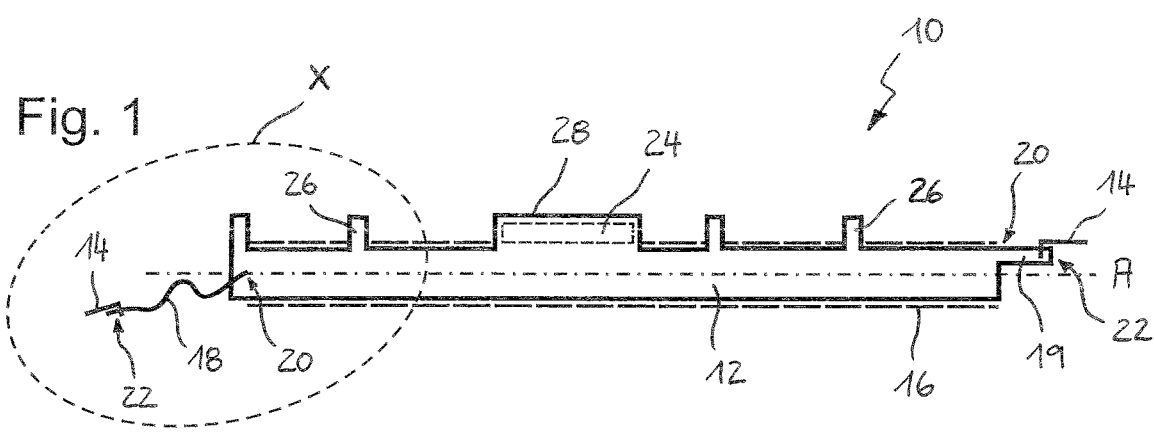
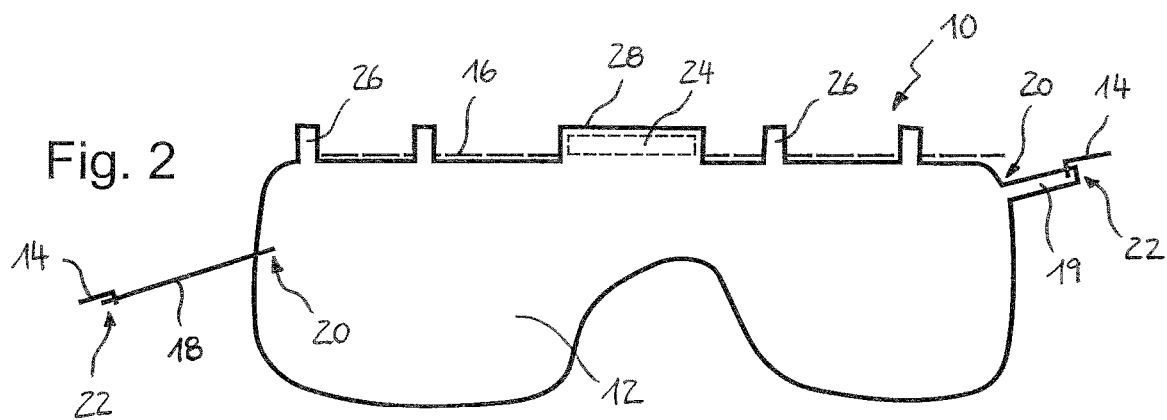
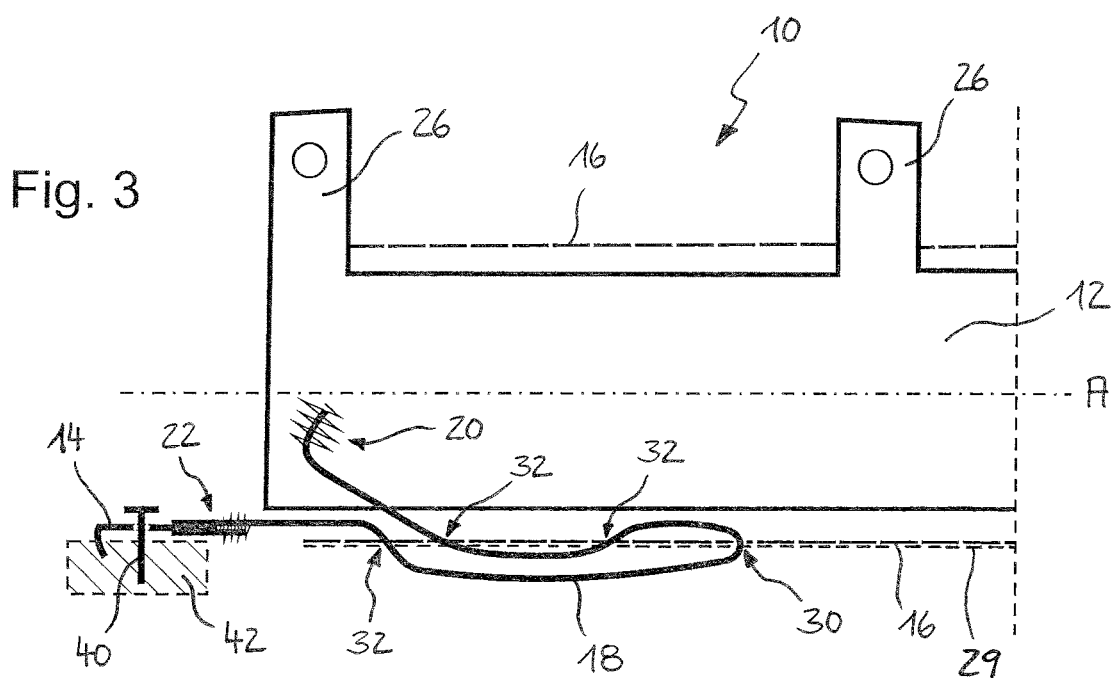

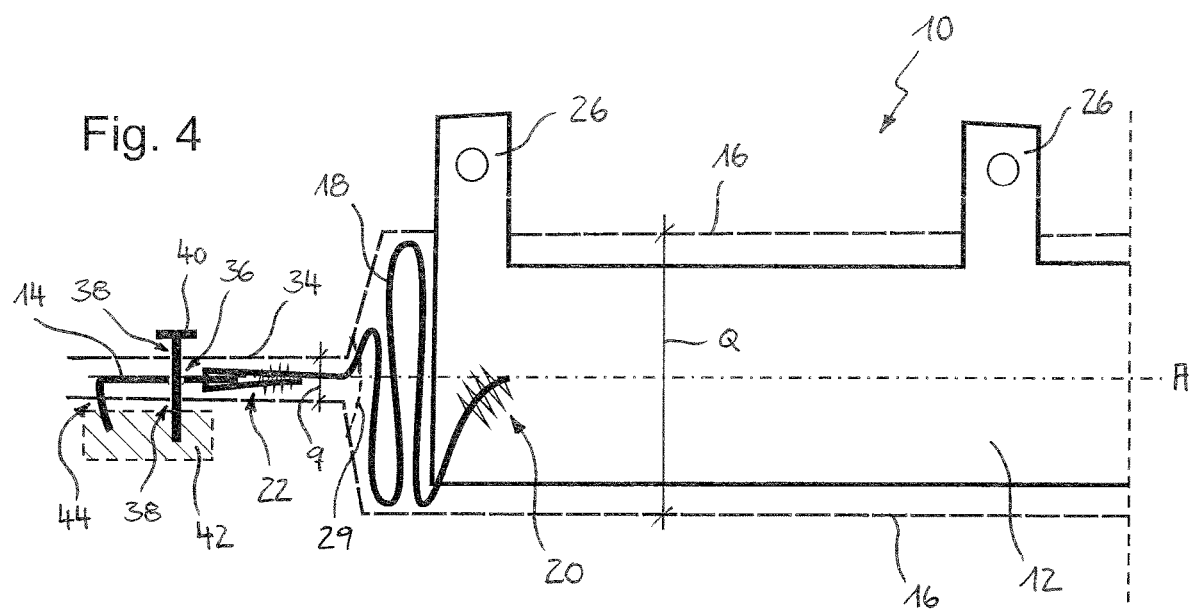

AIRBAG MODULE FOR AUTOMOTIVE VEHICLE

CROSS-REFERENCE TO RELATED APPLICATIONS

This application is a national stage of International Application No. PCT/EP2019/081823, filed Nov. 19, 2019, the disclosure of which is incorporated herein by reference in its entirety, and which claimed priority to German Patent Application No. 202018106544.0, filed Nov. 19, 2018, the disclosure of which is incorporated herein by reference in its entirety.

TECHNICAL FIELD

The disclosure relates to an airbag module for an automotive vehicle. In one arrangement, the disclosed airbag module comprises a folded inflatable airbag, a fastening element for mounting the airbag on the automotive vehicle, a mounting jacket in which the folded airbag is accommodated and fixed, as well as an elongate flexible holding strap for positioning the airbag in its deployed inflated state.

BACKGROUND

Airbags, especially those for restraining vehicle occupants, are designed to adopt a defined position relative to the vehicle in the vehicle interior in their deployed inflated state to achieve a predetermined restraining effect.

In many known airbags, an edge of the airbag is fixed within the vehicle, with a respective filling opening clamped to a housing part of an airbag module. Examples of such airbags are front airbags for drivers and passengers.

Moreover, there are also side airbags, however, which are in the form of a curtain airbag, for example. Curtain airbags are fixed to the vehicle not only in the area of their filling opening but also by elongate flexible holding straps. Said holding straps are fastened both on the airbag and on the vehicle to bridge the distance between the airbag and the respective attachment point within the vehicle. In the case of an accident, the airbag is retained in its desired position by said holding straps. Usually the holding straps are fastened to the A, B, C and/or D pillars of the vehicle.

For mounting a holding strap to the vehicle, usually a fastening element attached to the holding strap is provided. In the state of the art, said fastening elements usually are lugs made from sheet metal. The lugs may be provided with a hook-shaped extension and/or an opening to snap-fasten the lugs into an opening of the vehicle body, for example, and to screw them to the vehicle body. An airbag fastened in this way is known, e.g. from EP 2 995 513 A1.

After mounting the airbag module to the vehicle body, the holding strap is still loose and is not tensioned before deployment of the airbag. There is at least the option that the loosely hanging holding strap may get pinched, for example, when an inner vehicle lining is attached, which later might result in undesired delay or impairment of airbag deployment when the airbag module is activated. Furthermore, issues in further vehicle assembly are possible. For example, an assembler or an assembling robot may get caught by the loose holding strap portion of the airbag module.

Therefore, there is a need to provide an airbag module in which reliable, quick and predefined airbag deployment may be accomplished with little effort.

SUMMARY

An airbag module of the type mentioned above is disclosed in which a holding strap is connected to a mounting jacket or is received in the mounting jacket in a folded state of the airbag. Apart from fixation of the folded airbag, the mounting jacket also serves for positioning and fixing the holding strap in position so that there are no loose holding strap portions freely hanging around outside the airbag module.

In one exemplary arrangement, the holding strap is a textile holding strap, such as a fabric holding strap, which allows the holding strap to be manufactured at low cost with high tensile strength and to be fastened to the airbag by stitching with little effort. The airbag may be equally made from fabric. Alternatively, other configurations such as use of a plastic film, are contemplated by the disclosure.

In one exemplary embodiment of the airbag module, the holding strap is designed separately and is connected, especially stitched, to the airbag at a first strap end. Alternatively, it is also contemplated, however, to design the holding strap as an airbag extension so that the airbag integrally merges into the holding strap at the first strap end.

In one exemplary arrangement, in a deployed inflated state of the airbag, the holding strap is tensioned between the first strap end and the fastening element to be stretched over its free strap length, with the holding strap being connected to the mounting jacket or received in the mounting jacket in the folded state of the airbag so that it is turned over or folded at least once to reduce the free strap length.

According to one exemplary arrangement of the airbag module, the airbag is a curtain airbag, especially a curtain side airbag. Said airbag modules are especially large and frequently include long holding straps so that loose strap portions are difficult and positioning or fixing the holding strap in the folded state of the airbag would be desirable.

In one exemplary arrangement, in curtain airbags, the mounting jacket may be a mounting tube elongated along a longitudinal axis which, at least at one axial end, has a tube end portion of reduced tube section and wherein the second strap end extends through the tube end portion and the remaining holding strap is folded and received in the mounting tube adjacent to the tube end portion.

In one exemplary arrangement, the fastening element is a sheet metal lug, and may be a cut and bent part made from steel.

The mounting jacket may be manufactured from tearable material and/or may include predetermined breaking points so that the mounting jacket provides a mounting fixation, but also tears upon deployment of the airbag. While conventional mounting jackets made from thin fabric or plastic material are already known for mounting fixation of the airbag and to tear upon deployment thereof. However, now merely upon tearing the mounting jackets, the holding strap received therein or fastened thereto will also be released. Said mounting jackets may be made from an elongate material strip, for example, the longitudinal edges of which may be superimposed and interconnected by a longitudinal seam so that an elongate mounting tube is formed.

According to another exemplary arrangement of the airbag module, the fastening element is connected to the mounting jacket. In this way, it is ensured that the (loose) holding strap remains within the mounting jacket, e.g. in a folded or crumpled up state, and is not inadvertently removed, until the mounting jacket is torn.

In this exemplary embodiment of the airbag module, the fastening element and the mounting jacket may include corresponding mounting holes for receiving a mounting bolt which secure the mounting jacket and the fastening element to the vehicle, and in one exemplary arrangement, to a body of the automotive vehicle. Alternatively, or additionally, the fastening element, especially a hook-shaped extension of the fastening element, may extend through an opening in the mounting jacket.

According to another exemplary arrangement, the mounting jacket, and in one exemplary arrangement, the circumferential wall thereof, includes a radial opening, with the holding strap extending through said opening and being diverted at an opening edge thereof. The opening may be arranged so that the strap diversion helps to remove the play from the originally loose strap portion. Thus, the holding strap is largely fixed in position with minimum effort and has no loose strap portion. In one exemplary arrangement, the mounting jacket may include plural openings through which the holding strap is threaded. In this way, stronger interlocking and consequently closer connection between the holding strap and the mounting jacket are formed.

BRIEF DESCRIPTION OF THE DRAWINGS

Further features of the disclosure will be evident from the following description of exemplary arrangements, with reference to the drawings, wherein:

FIG. 1 shows a schematic sectional view of an airbag module comprising an airbag in its folded state;

FIG. 2 shows the airbag module of FIG. 1 comprising the airbag in its deployed inflated state;

FIG. 3 shows a detail of an airbag module according to an exemplary arrangement in an area of a holding strap according to one embodiment; and FIG. 4 shows a detail of an airbag module according to an exemplary arrangement in an area of a holding strap according to another embodiment.

DETAILED DESCRIPTION

FIG. 1 schematically illustrates an airbag module 10 for an automotive vehicle, comprising a folded inflatable airbag 12, fastening elements 14 for mounting the airbag 12 on the vehicle, a mounting jacket 16 in which the folded airbag 12 is received and fixed as well as elongate flexible holding straps 18, 19 for positioning the airbag 12 in its deployed inflated state (FIG. 2). In one exemplary arrangement, each of the holding straps extend from a first strap end 20 fastened to the airbag 12 to an opposite second strap end 22 to which a fastening element 14 is attached.

FIG. 2 illustrates the airbag module 10 according to FIG. 1 with the airbag 12 in a deployed inflated state, after release of an inflator 24 indicated in broken lines.

According to FIGS. 1 and 2, the airbag 12 includes at its upper edge, mounting lugs 26 for fastening to the vehicle, and in on exemplary arrangement, to a roof rail of the vehicle. Further, at the upper airbag edge, a holding bag 28 for the inflator 24 is provided, wherein the inflator 24 may also be fastened to the roof rail of the vehicle. The airbag 12 shown in the exemplary arrangement depicted in FIGS. 1 and 2 is a curtain airbag, and in one exemplary arrangement, a curtain side airbag for a vehicle.

In the exemplary airbag shown in FIGS. 1 and 2, usually comparatively long holding straps 18, 19 are provided for positioning the airbag 12 in its deployed inflated state. However, the present disclosure is not restricted to curtain airbags and may be utilized with all other airbag types comprising corresponding holding straps 18, 19.

In one exemplary arrangement, the holding straps 18, 19 used are textile straps, and may be fabric straps, as they can reliably absorb high loads upon release of the airbag module 10 and moreover can also be easily manufactured at low cost.

According to FIGS. 1 and 2, the holding strap 18 is separately designed and is connected, such as by stitching, for example, to the airbag 12 at the first strap end 20. On the other hand, the holding strap 19 is designed as an airbag extension so that at the first strap end 20, the airbag 12 integrally merges into the holding strap 19.

At the second strap end 22, each of the holding straps 18, 19 is tightly connected to a fastening element 14. In one exemplary arrangement, the fastening element 14 is a robust sheet metal lug, which may be a cut and bent part made from steel which can be easily manufactured at low cost.

The mounting jacket 16 of the airbag module 10 according to the exemplary arrangement in FIG. 1 is an elongate mounting tube extending along a longitudinal axis A which provides a mounting fixation for the folded airbag 12. For example, the mounting jacket 16 may be made from a plastic film or thin fabric, wherein the material used tears comparatively quickly and/or has predetermined breaking points 29 (best seen in FIG. 3), so that the mounting jacket 16 quickly tears upon activation of the inflator 24 and enables rapid deployment of the airbag 12.

After mounting the airbag module 10 on the automotive vehicle, the holding strap 18, 19 is loose and may get jammed when an interior lining of the vehicle is applied and/or may obstruct the further vehicle assembly. The airbag 12 strongly contracts in an axial direction during inflation, but not before the inflator 24 is activated so that the loose holding strap 18, 19 is tensioned and thus the airbag 12 is moved to a predetermined restraining position.

In order to avoid undesired loose holding strap portions after assembling the airbag module 10, each of the FIGS. 3 and 4 shows an enlarged view of area X of the airbag module 10 taken from FIG. 1. The airbag 12 is in the folded state in the exemplary arrangement embodiment according to FIG. 3, with the holding strap 18 being connected to the mounting jacket 16. In the exemplary embodiment depicted in FIG. 4, the holding strap is completely accommodated in the mounting jacket 16.

In one exemplary arrangement, the holding strap 18 may be tensioned in the deployed inflated state of the airbag 12 (as shown in FIG. 2) between the first strap end 20 and the fastening element 14 to be stretched over its free strap length. When the holding strap 18 is in the folded state of the airbag 12, as shown in FIGS. 3 and 4, the holding strap 18 is connected to the mounting jacket 16 or is accommodated in the mounting jacket 16 so that it is turned over or folded at least once to reduce the free strap length.

In one exemplary arrangement of the airbag module 10 according to FIG. 3, the holding strap 18 is connected to the mounting jacket 16 in the form of a mounting tube. A circumferential wall of the mounting tube includes a radial opening 30, with the holding strap 18 extending through said opening 30 and being diverted at an opening edge thereof. The opening 30 in this case is positioned in the mounting tube so that after assembly of the airbag module 10 the holding strap 18 neither will hang loosely, nor will be excessively tensioned either. After release of the airbag module 10, the holding strap 18 is reliably released, as the deploying airbag 12 and/or the tensioning holding strap 18 will tear the mounting tube.

As shown in FIG. 3, in the circumferential wall of the mounting tube further openings 32 may be provided through which the holding strap 18 may be threaded. This arrangement provides a stronger interlocking between the holding strap 18 and the mounting jacket 16, resulting in little slack of the holding strap 18.

In the exemplary arrangement shown in FIG. 4, the mounting jacket 16 in turn is in the form of an elongate mounting tube which extends along the longitudinal axis A and has a largely constant tube section Q in the area of the folded airbag 12. At least at one axial end of the mounting tube, a tube end portion 34, has a reduced tube section q formed therein. The second strap end 22 of the holding strap 18 extends into the tube end portion 34, through at least part of the tube end portion 34, and the remaining holding strap 18 is folded and accommodated in the mounting tube adjacent to the tube end portion 34.

The reduced tube section q may be formed, for example, by a longitudinal seam that is removed toward the axial end of the mounting tube from longitudinal edges of a material strip forming the mounting tube, thus causing the cross-section Q to decrease.

Alternatively, the reduced tube cross-section q can also be realized by single or multiple zigzag-folding and, resp., folding of the mounting tube, with the axial end of the mounting tube being substantially folded in the axial direction. The folding can be fixed by stitching or bonding. In addition, it is also contemplated that fixation may be achieved by a mounting bolt 40 and a washer (not shown in FIG. 4) which prevents the pre-assembled mounting bolt 40 from slipping out of mounting holes 36, 38 of the fastening element 14 and of the tube end portion 34.

For example, the fastening element 14 may be connected to the mounting jacket 16 so that the holding strap 18 is largely prevented from being inadvertently withdrawn from the mounting jacket 16. Said connection can be made e.g. by stitching, bonding or else by inserting the fastening element 14 through the mounting jacket 16.

In the event of such connection between the fastening element 14 and the mounting jacket 16 in the form of a mounting tube, other exemplary arrangements of the airbag module 10 that include a mounting tube having a constant tube section Q are also contemplated. In this case, the potential for the holding strap 18 being inadvertently withdrawn from the mounting tube even without a tube end portion 34 having a reduced tube section q is reduced. This helps to advantageously reduce the manufacturing costs for the mounting jacket 16.

After release of the airbag module 10, the mounting jacket 16 is torn by the deploying airbag 12 and consequently also releases the held holding strap 18 in a reliable manner.

According to the arrangement depicted in FIG. 4, the fastening element 14 and the mounting jacket 16 include corresponding mounting holes 36, 38 for receiving a mounting bolt 40, with the mounting bolt 40 securing the mounting jacket 16 and the fastening element 14 to a body 42 of the vehicle.

Furthermore, in the shown example configuration also the fastening element 14, more specifically a hook-shaped extension of the fastening element 14, extends through an opening 44 in a circumferential wall of the mounting tube.

It is understood that the foregoing explanations about the holding strap 18 are equally applicable to the holding strap 19 of the airbag module 10.

The invention claimed is:

1. An airbag module for an automotive vehicle, comprising a folded inflatable airbag, a fastening element for mounting the airbag on the vehicle, a mounting jacket in which the folded airbag is received and fixed, an elongate flexible holding strap for positioning the airbag in a deployed inflated state, the holding strap extending from a first strap end fastened on the airbag to an opposite second strap end to which the fastening element is attached, wherein in a folded state of the airbag, the first strap end of the holding strap is fastened on a portion of the airbag that is positioned within the mounting jacket, wherein when the airbag is in the deployed inflated state, the holding strap is tensioned between the first strap end and the fastening element and stretched over a free strap length, wherein the mounting jacket is an elongate mounting tube extending along a longitudinal axis and having a largely constant tube cross-section, wherein the mounting tube includes a circumferential wall that includes at least two radial openings formed therethrough, wherein when the holding strap is in the folded state the holding strap is threaded through the openings so that the holding strap is folded at least once within the mounting jacket for reducing the free strap length.

2. The airbag module of claim 1, wherein the holding strap is a textile strap.

3. The airbag module of claim 1, wherein the holding strap is separately configured and is connected to the airbag at the first strap end.

4. The airbag module of claim 1, wherein the holding strap is in the form of an airbag extension such that the airbag integrally merges into the holding strap at the first strap end.

5. The airbag module of claim 1, wherein the airbag is a curtain airbag.

6. The airbag module of claim 1, wherein the mounting jacket is made from tearable material so that the mounting jacket provides a mounting fixation and tears upon deployment of the airbag.

7. The airbag module of claim 1, wherein the mounting jacket includes predetermined breaking points so that the mounting jacket provides a mounting fixation and tears upon deployment of the airbag.

8. An airbag module for an automotive vehicle, comprising:
   a folded inflatable airbag,
   a fastening element for mounting the airbag on the vehicle,
   a mounting jacket in which the folded airbag is received and fixed, wherein the fastening element is connected to the mounting jacket,
   an elongate flexible holding strap for positioning the airbag in a deployed inflated state, the holding strap extending from a first strap end fastened on the airbag to an opposite second strap end to which the fastening element is attached,
   wherein in a folded state of the airbag, the holding strap is connected to the mounting jacket or is received in the mounting jacket
   wherein the fastening element and the mounting jacket include corresponding mounting holes for receiving a mounting bolt which secures the mounting jacket and the fastening element to the vehicle.

9. The airbag module of claim 8, wherein the fastening element extends through an opening in the mounting jacket.

10. The airbag module of claim 8, wherein the airbag is a curtain airbag.

11. An airbag module for an automotive vehicle, comprising a folded inflatable airbag, a fastening element for mounting the airbag on the vehicle, a mounting jacket in which the folded airbag is received and fixed, an elongate flexible holding strap for positioning the airbag in a deployed inflated state, the holding strap being separately configured and connected and extending from a first strap end fastened on the airbag to an opposite second strap end to which the fastening element is attached, wherein in a folded state of the airbag, the first strap end of the holding strap is fastened on the airbag that is positioned within the mounting jacket such that the holding strap is received in the mounting jacket and folded at least once in the mounting jacket for reducing a free strap length and wherein in the deployed inflated state of the airbag, the holding strap is tensioned between the first strap end and the fastening element and stretched over the free strap length; wherein the mounting jacket is an elongate mounting tube extending along a longitudinal axis and having a largely constant tube cross-section which includes a tube end portion having a reduced tube cross-section at least at one axial end, and wherein the second strap end extends into the tube end portion and a portion of the holding strap is received in the mounting tube adjacent the tube end portion; wherein the fastening element is connected to the mounting jacket and wherein the fastening element and the mounting jacket include corresponding mounting holes for receiving a mounting bolt which secures the mounting jacket and the fastening element to the vehicle.

12. An airbag module for an automotive vehicle, comprising a folded inflatable airbag, a fastening element for mounting the airbag on the vehicle, a mounting jacket in which the folded airbag is received and fixed, an elongate flexible holding strap for positioning the airbag in a deployed inflated state, the holding strap extending from a first strap end fastened on a portion of the airbag to an opposite second strap end to which the fastening element is attached, wherein the mounting jacket is an elongate mounting tube extending along a longitudinal axis and having a largely constant tube first cross-section, and a tube end portion extending along the longitudinal axis that tapers inwardly toward the longitudinal axis to a largely constant tube second cross-section at least at one axial end that is smaller than the first cross-section, and wherein the airbag is positioned within the first cross-section when in a folded state, and the second strap end extends into the tube end portion and the holding strap is folded upon itself in a tapered section disposed between the first cross-section and the second cross-section reducing a free strap length when the airbag is in the folded state, and the second strap end extends into the second cross-section; wherein when the airbag is in the deployed inflated state, the holding strap is tensioned between the first strap end and the fastening element and stretched over the free strap length.

13. The airbag module of claim 12, wherein the mounting jacket is made from tearable material so that the mounting jacket provides a mounting fixation and tears upon deployment of the airbag.

14. The airbag module of claim 12, wherein the holding strap is a textile strap.

15. The airbag module of claim 12, wherein the holding strap is separately configured and is connected to the airbag at the first strap end.

16. The airbag module of claim 12, wherein the mounting jacket includes predetermined breaking points so that the mounting jacket provides a mounting fixation and tears upon deployment of the airbag.

* * * * *